United States Patent [19]

Petcavich

[11] Patent Number: 5,367,003

[45] Date of Patent: Nov. 22, 1994

[54] DISPOSABLE DEGRADABLE RECYCLABLE PLASTIC ARTICLES AND SYNTHETIC RESIN BLENDS FOR MAKING THE SAME

[76] Inventor: Robert J. Petcavich, 4136 Palisades Rd., San Diego, Calif. 92116

[21] Appl. No.: 80,079

[22] Filed: Jun. 18, 1993

Related U.S. Application Data

[63] Continuation-in-part of Ser. No. 847,960, Mar. 5, 1992, abandoned, which is a continuation-in-part of Ser. No. 690,106, Apr. 23, 1991, abandoned.

[51] Int. Cl.$^5$ .............................................. C08J 5/00
[52] U.S. Cl. .................................. 523/124; 524/522; 524/524; 524/526; 524/534; 524/538; 525/231; 525/232; 525/298; 525/312; 525/426
[58] Field of Search ........................ 523/124, 125, 128; 524/47, 376, 378, 445, 449, 494, 534, 522, 524, 526, 538; 525/231, 232, 298, 312; 528/499

[56] References Cited

U.S. PATENT DOCUMENTS

| | | | |
|---|---|---|---|
| 3,085,081 | 4/1963 | Bailey, Jr. | 525/409 |
| 3,278,521 | 10/1966 | Klug | 260/231 |
| 3,314,809 | 4/1967 | Klug | 106/197 |
| 3,479,190 | 11/1969 | Ganz | 99/139 |
| 3,632,687 | 1/1972 | Walter et al. | 260/896 |
| 3,655,830 | 4/1972 | Smith | 525/187 |
| 3,724,462 | 4/1973 | Hanke | 128/263 |
| 3,734,979 | 5/1973 | Walter et al. | 260/897 |
| 3,852,913 | 12/1974 | Clendinning et al. | 47/37 |
| 3,867,324 | 2/1975 | Clendinning et al. | 260/23 H |
| 3,882,869 | 5/1975 | Hanke | 524/378 |
| 3,919,163 | 11/1975 | Clendinning et al. | 260/40 R |
| 3,932,319 | 1/1976 | Clendinning et al. | 524/47 |
| 3,935,308 | 1/1976 | Wise | 424/78 |
| 4,018,729 | 4/1977 | Faucher et al. | 525/231 |
| 4,170,821 | 10/1979 | Booth | 30/41 |
| 4,306,552 | 12/1981 | Gregory | 128/156 |
| 4,379,138 | 4/1983 | Pitt et al. | 424/78 |
| 4,624,051 | 11/1986 | Apprille, Jr. | 30/50 |

FOREIGN PATENT DOCUMENTS

| | | |
|---|---|---|
| 0409781 | 1/1991 | European Pat. Off. |
| 3714486 | 9/1962 | Japan |
| 2024082 | 1/1980 | United Kingdom |
| 2183523 | 6/1987 | United Kingdom |

OTHER PUBLICATIONS

"Hydroxypropylcellulose", R. W. Butler and E. O. Klug, Hercules, Inc., Chapter 13, pp. 13-1 to 13-17.
"KLUCEL Hydroxypropylcellulose", Aqualon Company, Feb. 1991 front and rear covers and pp. 1-24.
Union Carbide Corp., "POLYOX Water Soluble Resin- (List continued on next page.)

Primary Examiner—Tae H. Yoon
Attorney, Agent, or Firm—Juettner Pyle Lloyd & Piontek

[57] ABSTRACT

Environmentally friendly, disposable, degradable and/or recyclable plastic articles are made from water soluble, miscible, high molecular weight, thermoplastic, polymeric resin blends that are comprised by weight of about 65% to 95% high molecular weight water soluble thermoplastic resin having an inverse solubility characteristic and about 35% to 5% of at least one of certain high molecular weight thermoplastic polymers that are functionally compatible (miscible) with the inversely soluble resin. The articles are insoluble when used for their intended purposes, but become soluble when exposed to tepid or cool water and degradable when buried in a land fill or compost. The inversely soluble resin comprises high molecular weight poly(ethylene oxide). The compatible polymer is selected from the group consisting of Nylon 11, Nylon 12, polycaprolactone, polycaprolactone, polyethylene-co-acrylic acid, polyethylene-co-methacrylic acid, polyethylene-co-vinylacetate and polyethylene-co-vinylalcohol. The articles are hydrodegradable, e.g., flushable, biodegradable, e.g., compostable, and can be recycled if desired, thereby eliminating the trash and garbage problems inherent in the use of nondegradable plastics.

7 Claims, No Drawings

OTHER PUBLICATIONS s—Thermoplastic Processing", May 1972 (May 1972).
Union Carbide Corp., "Poly(Ethylene Oxide)", David B. Braun, Apr. 1990 (Apr. 1990).
Union Carbide Corp., "POLYOX Water Soluble Resins Are Unique", 1981.
"Thermoplastics", date and author unknown, pp. 283-284.
"National Research and Development Plan of Biodegradable Plastics in Japan", date and author unknown, pp. 1-12.
Mark et al., Encyclopedia of Polymer Science and Technology, 1971, Wiley, New York, p. 308.
Modern Plastics, Mid-Dec. 1992, pp. 58-63.
"National Research and Development Plan of Biodegradable Plastics in Japan", author and date unknown, pp. 1-12.
"TONE® Polymers-Biodegradable Plastic Resins", published by Union Carbide Chemicals and Plastics Company, Inc. author unknown, 1990, pp. 1-17.
"Specific Interactions and the Miscibility of Polymer Blends", Coleman, Graf & Painter, Technomic Publishing Co., Inc., 1991, Library of Congress Card No. 91-65261, ISBN No. 87762-823-8.

DISPOSABLE DEGRADABLE RECYCLABLE PLASTIC ARTICLES AND SYNTHETIC RESIN BLENDS FOR MAKING THE SAME

CROSS REFERENCE

The present application is a continuation-in-part of copending application Ser. No. 07/847,960, filed Mar. 5, 1992, now abandoned, which in turn is a continuation-in-part of application Ser. No. 07/690,106, filed Apr. 23, 1991, now abandoned.

FIELD OF THE INVENTION

The present invention relates to miscible high molecular weight thermoplastic polymer blends and disposable plastic articles made therefrom that are hydrodegradable, biodegradable and/or recyclable.

BACKGROUND

There are a wide variety of disposable plastic articles of manufacture in use today. Because of their low cost and convenience, they are very popular and not readily displaceable in terms of consumer appeal and demand.

However, many of these articles are not degradable and are not readily or economically recyclable. Consequently, they have caused and are causing a monumental waste disposal problem and are an environmental hazard to our society.

The object of the present invention is to provide a broad range of disposable and degradable plastic articles to replace the articles that are currently made from nondegradable plastics that cannot commercially or economically be recycled.

SUMMARY OF THE INVENTION

An object of the present invention is to provide articles of manufacture, and synthetic resin blends for making articles of manufacture, that have all of the physical characteristics and advantages of conventional disposable plastic articles and that, in addition, are degradable or recyclable.

Another object of the invention is to provide miscible high molecular weight thermoplastic polymer blends or alloys that are degradable and recyclable and that are conveniently and economically processed on existing standard manufacturing equipment, in manners known and conventional in the art, to produce disposable plastic articles that will be attractive and economical, and most importantly, will be degradable and recyclable.

In accordance with the invention, degradable and recyclable articles of manufacture are made from a resin blend comprised essentially of from about 65% to about 95% of water soluble thermoplastic resin having an inverse solubility characteristic and from about 35% to about 5% of at least one functionally compatible thermoplastic resin, i.e., a resin that is miscible with and forms an alloy with the inversely soluble resin.

The inversely soluble resin presently known to be the best mode for practice of the invention is high molecular weight poly(ethylene oxide), hereinafter sometimes referred to as "PEO".

PEO has a negative or inverse water solubility characteristic. It will not dissolve or melt in the presence of high temperature media, e.g., media having a temperature near the boiling point of water, but will rapidly dissolve in cool or cold water. The rate of dissolution of the resin alone is so rapid, that a cup of coffee or tea cannot be consumed in a customary period of time without at least partial dissolution of the cup, resulting in the liquid leaking from the cup and making a mess. Therefore, PEO has not heretofore been used for a broad range of consumer applications calling for a measurable service life with subsequent degradation.

The present invention resides in the discovery that the addition of certain high molecular weight thermoplastic polymers to PEO results in a miscible high molecular weight polymeric blend providing a controlled or controllable rate of dispersion, dissolution or degradation. By proper selection of the functionally compatible resin and by proper adjustment of the ratio of the compatible resin to the inversely soluble resin, degradation time can be varied from several minutes, to several hours, to days, weeks and months. In accordance with the invention, the ratio of the compatible resin or resins, together with minor proportions of fillers and processing agents if desired, is in the order of from about 5% to about 35% of the resin blend, the balance comprising PEO. Generally speaking, the higher the percentage of the compatible resin, the longer is the dissolution time.

Therefore, disposable articles heretofore made of nondegradable plastic may now be molded, extruded or otherwise formed from a material that is dispersable or soluble in water over a preselected period of time, and that will upon dissolution, e.g., in a compost or land fill, leave behind a harmless powder occupying only an infinitesimal fraction of the space that would be occupied by a comparable nondegradable product. Also, if an article made in accordance with the invention falls overboard from a boat, or is flushed down a toilet, or is otherwise exposed to cool water, it will disperse or dissolve in the water leaving little or no discernable trash or garbage behind.

Moreover, if desired and when economically feasible, articles made in accordance with the invention can be recycled with particular ease. The articles need only be placed in cool or cold water, either fresh water or salt water, to dissolve the article, whereupon the compatible resin and filler materials will either float to the surface or settle out in the water, whereupon they can be recovered and reclaimed. Thereafter, the water can be heated to near boiling, which will cause the water soluble resin, i.e., the poly(ethylene oxide), to be precipitated out of the water, whereupon it too can be recovered and reclaimed, leaving behind essentially only clear water.

Consequently, the articles of the invention are biodegradable, hydrodegradable and recyclable.

Thus, the invention provides environmentally friendly and ecologically advantageous solutions to the trash and garbage problems caused by nondegradable plastics.

These and other objects and advantages of the invention will become apparent from the following detailed description.

DETAILED DESCRIPTION

The following is a detailed description of the best mode presently contemplated by the inventor for carrying out the invention. Drawings are not deemed necessary to a full disclosure of the invention inasmuch as the articles of manufacture presently contemplated for practice of the invention and the manner of making the same are notoriously old and well known in the art. Examples of such articles include plastic cups and containers, plastic bags, nonwoven fabrics, flushable films, food service utensils such as picnic plates, forks, knives and spoons, egg cartons, containers or pots for plants to be planted in the ground, disposable personal hygiene products, and disposable diapers.

In essence, the invention is useful for almost any end purpose not involving long term exposure to a cool water-based liquid.

In accordance with the invention, such products and articles are produced from about 65 to about 95 weight percent, i.e., percent by weight, of high molecular weight water soluble thermoplastic resin having an inverse solubility characteristic, specifically PEO, and about 35 to about 5 weight percent of one or more of certain specific high molecular weight thermoplastic resins that are functionally compatible with the inversely soluble resin, i.e., miscible with and forming an alloy with the inversely soluble resin. Minor proportions of fillers and processing agents may be added, if desired.

The resultant miscible high molecular weight thermoplastic polymeric alloy blend may be formed into films, fibers or filaments, or may be injection molded or extruded, all in manners and by methods and machinery well known and conventional in the art.

The water soluble resin having an inverse solubility characteristic and comprising the best mode known for carrying out the invention is high molecular weight poly(ethylene oxide) ("PEO"). PEO is the preferred resin because of its availability, ease of processing and relative economy. The molecular weight of the PEO should be at least 50,000 or more.

The functionally compatible miscible resins are comprised of high molecular weight polymers and copolymers having a molecular weight of at least 25,000 or more, and are selected on the basis of their compatibility with PEO and the particular characteristics they may impart to a resin blend intended for a particular purpose. Miscible polymeric blends are characterized by mixing at the molecular level and exhibiting a single glass transition temperature. They become single phase solids with no phase separation during processing or use. Consequently, the miscible alloy blends of the invention can be processed and used the same as any single phase polymeric resin.

The miscible thermoplastic polymers that have been found to be suited for practice of the invention consist of Nylon 11, Nylon 12, polyethylene-co-acrylic acid, polyethylene-co-methacrylic acid, polyethylene-co-vinylacetate, and polyethylene-co-vinylalcohol.

For the formation of films, a resin blend comprised of about 85% by weight of PEO and about 15% by weight of polyethylene-co-acrylic acid is preferred. Such films may be produced in a conventional manner by tubular extrusion or other known film forming techniques. Even at a thickness as little as one mil, such films are very strong and are useful, for example, for the formation of a wide variety of bags, e.g., trash and garbage bags. Additionally, since such films are water-dispersible and hydrodegradable and therefore flushable in a toilet, the same are especially well suited for use as the backing material for flushable diapers and personal hygiene products.

For the production of injection molded products, a resin blend comprised of about 85 weight percent (wt. %) of PEO and about 15 weight percent (wt. %) of polyethylene-co-vinyl alcohol is preferred. An extremely wide variety of hydrodegradable, biodegradable and/or recyclable products may be molded from this blend. As a specific example, flushable tampon applicators having a hydro-dissolution time of about five minutes or less have been efficiently and economically injection molded from a polymeric blend comprised of 85 wt. % of PEO, 13.5 wt. % of polyethylene-co-vinyl alcohol, 1 wt. % of calcium stearate and 0.5 wt. % of a mold release agent, e.g., a fatty acid.

For the formation of filaments and fibers, a resin blend especially preferred is comprised of 85 weight percent of PEO and 15 weight percent of Nylon 11. The blend may be extruded, melt spun or melt blown in conventional known manners to form fibers having a variety of uses, for example, in disposable personal hygiene products and in the formation of nonwoven fabrics.

To enhance the processability of the above-described resin blends, a plasticizer or lubricant may be added to the blend in an amount of up to about 30% by weight, but more customarily in the order of about 5% by weight. A typical blend formulation including a lubricant or plasticizer would be in the order of about 80 wt. % PEO, about 15 wt. % compatible polymer and about 5 wt. % lubricant. Suitable lubricants include Tween Twenty available from ICI Americas, Turgitol NP13 available from Union Carbide, and various fatty acids such as Kenamide E available from Witco Chemical.

If desired, compatible fillers may be added to the resin blends in amounts up to about 5 weight percent. A typical formulation would be 75 wt. % PEO, 15 wt. % compatible polymer, 5 wt. % lubricant and 5 wt. % filler. Suitable fillers include glass microspheres, polymer microspheres, clay, mica and mixtures thereof.

If it is desired to produce a foam container or article, a foaming or blowing agent, such as calcium carbonate or sodium bicarbonate, may be added to the resin blend in an amount from about 0.5 to about 2.5 weight percent. Alternatively, a gas, such as nitrogen, may be directly injected into the resin blend as it is being extruded or fed into a mold.

For food and beverage applications, constituent ingredients of the resin blends can be obtained in FDA approved form from companies such as Dow, DuPont, Shell, General Electric and BF Goodrich.

Resin blends formulated as above described are biologically inert and readily processed under heat and pressure. They may be processed as films, fibers and filaments; they are extrudable; and they are moldable by either injection molding or extrusion molding. The blends are therefore ideal for economical mass production of disposable consumer products.

High molecular weight PEO has a negative or inverse solubility characteristic. It is soluble in cold and warm water, either fresh or salt water, but insoluble in hot water approaching the boiling point. PEO therefore lend itself well to sterilization. Also, for purposes of recycling, it eliminates the need for expensive and hazardous solvents, since PEO completely soluble in ordinary cold or cool water.

The resin blends of the present invention take full advantage of this inverse solubility characteristic and at the same time eliminate the problems that are consequent upon the fact that the resin itself is too readily and rapidly soluble in the presence of water and water based liquids. By blending a major proportion of the inversely soluble resin with a minor proportion of a selected functionally compatible thermoplastic polymer, the dissolution or degradation time of articles made from the resin blends can be controlled within an extremely broad range of time durations, ranging from minutes to months. Generally speaking, the higher the proportion of the selected compatible thermoplastic polymer the longer will be the degradation time.

In all of the examples above described, a relatively short but determinable dissolution or dispersion time was desired. In empirical tests, in which about 5 grams of each plastic product was immersed in about 100 grams of cool water, the product broke apart and was dispersed in the water within about five minutes or less.

As will be appreciated, the characteristics and the ratio of the thermoplastic polymer relative to the inversely soluble resin are quite critical. Too little thermoplastic polymer can result in an unstable end product that is too soluble for most consumer applications. Too much thermoplastic polymer can result in a product that will not disperse or dissolve within a reasonable period of time. To the contrary, the product has a tendency to absorb water and swell up, creating as much or more of a trash problem than nondegradable plastics.

Empirical observations to date indicate that the weight percent of thermoplastic polymer in the resin blend should not exceed in the order of about 35%, nor be any less than in the order of about 5%.

When, conditions or circumstances are such as to render recycling economically feasible, the invention provides a recycling process comprised of the steps of collecting used or discarded articles made in accordance with the invention, immersing a batch of the same in water, preferably cool ocean water, agitating the water and the articles therein until the articles are dissolved, recovering and drying the solid thermoplastic resin which floats to the surface of or precipitates out of the water, bringing the water up to a temperature near boiling to cause the inversely soluble resin to precipitate out of the water, recovering and drying the solid precipitate, reusing the recovered inversely soluble resin and compatible polymer, and recycling the water to the next batch of articles to be dissolved. By practice of this process, articles made in accordance with the invention are very nearly 100% recyclable.

The poly(ethylene oxide) used in practice of the invention is a high molecular weight resin available from Union Carbide Corporation, Danbury, Conn., under the trademark POLYOX, from Meisei Chemical Works Ltd. (Japan) under the trademark ALKOX and from Seitetsu Kagaku Co. Ltd. (Japan) under the acronym PEO. It is a dry free flowing white powder having a crystaline melting point in the order of about 65° C., above which the resin becomes thermoplastic and can be formed by molding, extrusion or calendering. A specially formulated compound, based on a medium high molecular weight poly(ethylene oxide) resin, is available from Union Carbide Corporation for use in thermoplastic applications including extrusion and molding. The exact composition of this compound, WRPA-3154, is proprietary, but it is known to contain plasticizers and stabilizers helpful in thermoplastic forming operations. The melt viscosity at temperatures 100° to 150° C. above the melting point is very high and it is therefore necessary to incorporate a plasticizing agent in the resin to achieve practical processing conditions.

The molecular weight of the PEO used in practice of the invention, as set forth in the Union Carbide POLYOX literature filed contemporaneously with the above-identified grandparent application, ranges from about 100,000 up to about 5,000,000; perhaps more realistically within the range of about 150,000 to 350,000.

Extensive testing with laboratory animals by Union Carbide Corporation and of a variety of marine life by the U.S. Naval Undersea Center indicates that poly(ethylene oxide) resins have a very low level of oral toxicity. They are not readily absorbed from the gastrointestinal tract. The resins are relatively nonirritating to the skin and have a low sensitizing potential. They caused only trace eye irritation when rabbits eyes were flooded with a 5% aqueous solution of the resin. There was little or no effect on the death rate of fish, crabs, sea anemone, lerine shrimp, or algae when exposed to resin concentrations ranging from 250 to 2,000 parts per million for periods of three to fifty days. Hence, both the dry resin as well as aqueous resin solutions have a low level of toxicity and can be handled safely.

The U.S. Food and Drug Administration recognizes the use of Union Carbide's resins in certain food and related applications.

High molecular weight poly(ethylene oxide) resins have a very low level of biodegradability. Data on the biochemical oxygen demand (BOD) as a function of concentration in aqueous solution confirm this. Union Carbide's resins are approved by the U.S. Environmental Protection Agency for unrestricted use as an inert ingredient in pesticide formulations applied to crops up to the time of harvest.

PEO resins are completely soluble in water over a broad pH range at all temperatures up to about 90° C. At or near the boiling point of water, they precipitate from solution. This phenomenon of inverse solubility provides a convenient technique for dispersing and dissolving these resins. In particular, disposal or recovery of the resins is convenient because of the complete water solubility and low biological oxygen demand. Nevertheless, even though the resins are completely water soluble, they are relatively resistant to sorption of atmospheric moisture at all but the highest relative humidities. Therefore, until immersed in cold or tepid water, articles of manufacture made in accordance with the present invention will enjoy an entirely satisfactory shelf life prior to use.

Experimental data has established that in order to attain all of the advantages of the invention, PEO should be blended with from at least about 5% and no more than about 35% by weight of at least one functionally compatible high molecular weight thermoplastic polymer selected from the group consisting of, Nylon 11, Nylon 12, polyethylene-co-acrylic acid, polyethylene-co-methacrylic acid, polyethylene-co-vinylacetate and polyethylene-co-vinylalcohol. These compatible polymers are known to produce advantageous results.

Therefore, the objects and advantages of the invention have been shown to be attained in a convenient, economical, practical and facile manner.

While preferred embodiments of the invention have been herein described, it is to be appreciated that various changes, rearrangements and modifications may be made therein without departing from the scope of the invention as defined by the appended claims.

What is claimed is:

1. A disposable, degradable, plastic article of manufacture made from a miscible, high molecular weight, water dispersable, thermoplastic polymeric resin blend consisting of in the order of about 80% high molecular weight poly(ethylene oxide), in the order of about 20% of a high molecular weight thermoplastic copolymer that is functionally compatible with said poly(ethylene oxide) and consisting of one or the other of polyethylene-co-acrylic acid and polyethylene-co-vinyl alcohol, and up to about 5% plasticizer.

2. A method of making disposable, degradable plastic articles of manufacture comprising the steps of forming a miscible, high molecular weight, water dispersable, thermoplastic polymeric resin blend consisting of in the order of about 80% high molecular weight poly(ethylene oxide), in the order of about 20% of a high molecular weight thermoplastic copolymer that is functionally compatible with said poly(ethylene oxide) and consisting of one or the other of polyethylene-co-acrylic acid and polyethylene-co-vinyl alcohol, and up to about 5% plasticizer, and processing said polymeric resin blend under heat and pressure to form articles therefrom.

3. A disposable, degradable, plastic article of manufacture made from a miscible, high molecular weight, water dispersable, thermoplastic polymeric resin blend consisting of from about 65% to about 95% high molecular weight poly(ethylene oxide), from about 35% to about 5% of at least one high molecular weight thermoplastic polymer that is functionally compatible with said poly(ethylene oxide) and selected from the group consisting of polyethylene-co-acrylic acid, polyethylene-co-methacrylic acid, polyethylene-co-vinyl acetate, polyethylene-co-vinyl alcohol, Nylon 11 and Nylon 12, and up to about 10% of plasticizer, lubricant and fillers.

4. A method of making disposable, degradable, plastic articles of manufacture comprising the steps of forming a miscible, high molecular weight, water dispersable, thermoplastic polymeric resin blend consisting of from about 65% to about 95% high molecular weight poly(ethylene oxide), from about 35% to about 5% of at least one high molecular weight thermoplastic polymer that is functionally compatible with said poly(ethylene oxide) and selected from the group consisting of polyethylene-co-acrylic acid, polyethylene-co-methacrylic acid, polyethylene-co-vinyl acetate, polyethylene-co-vinyl alcohol, Nylon 11 and Nylon 12, and up to about 10% of plasticizer, lubricant and fillers, and processing the polymeric resin blend under heat and pressure to form articles therefrom.

5. An article as set forth in claim 3, wherein the article is a water dispersable and degradable plastic film containing about 75% to 85% poly(ethylene oxide) and about 25% to 15% polyethylene-co-acrylic acid.

6. An article as set forth in claim 3, wherein the article is a water dispersable and degradable molded plastic article containing about 75% to 85% poly(ethylene oxide) and about 25% to 15% polyethylene-co-vinyl alcohol.

7. An article as set forth in claim 3, wherein the article is a water dispersable and degradable filament or fiber containing about 75% to 85% poly(ethylene oxide) and about 25% to 15% Nylon 11.

* * * * *